United States Patent
Hommura et al.

(10) Patent No.: US 10,879,551 B2
(45) Date of Patent: Dec. 29, 2020

(54) ELECTROLYTE MATERIAL, LIQUID COMPOSITION AND MEMBRANE/ELECTRODE ASSEMBLY FOR POLYMER ELECTROLYTE FUEL CELL

(71) Applicant: AGC Inc., Chiyoda-ku (JP)

(72) Inventors: Satoru Hommura, Chiyoda-ku (JP); Susumu Saito, Chiyoda-ku (JP); Hiroyuki Watabe, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/627,861

(22) Filed: Jun. 20, 2017

(65) Prior Publication Data

US 2017/0288249 A1    Oct. 5, 2017

Related U.S. Application Data

(63) Continuation of application No. PCT/JP2015/085561, filed on Dec. 18, 2015.

(30) Foreign Application Priority Data

Dec. 25, 2014   (JP) ................................. 2014-262600

(51) Int. Cl.
*H01M 8/1039* (2016.01)
*C08F 8/12* (2006.01)
(Continued)

(52) U.S. Cl.
CPC ............ *H01M 8/1039* (2013.01); *C08F 8/12* (2013.01); *C08F 214/184* (2013.01);
(Continued)

(58) Field of Classification Search
CPC .................................................. H01M 8/1039
See application file for complete search history.

(56) References Cited

U.S. PATENT DOCUMENTS

| 4,530,569 A | 7/1985 | Squire |
| 2008/0292931 A1* | 11/2008 | Schwartz ................ H01M 4/92 |
| | | 429/524 |

(Continued)

FOREIGN PATENT DOCUMENTS

| JP | 58-38707 | 3/1983 |
| JP | 6-16725 | 1/1994 |

(Continued)

OTHER PUBLICATIONS

International Search Report dated Mar. 8, 2016 in PCT/JP2015/085561, filed on Dec. 18, 2015.

*Primary Examiner* — Matthew J Merkling
(74) *Attorney, Agent, or Firm* — Oblon, McClelland, Maier & Neustadt, L.L.P.

(57) ABSTRACT

To provide a membrane/electrode assembly excellent in the power generation characteristics in a wide temperature range and a wide humidity range; an electrolyte material suitable for a catalyst layer of the membrane/electrode assembly; and a liquid composition suitable for forming a catalyst layer of the membrane/electrode assembly.

To use an electrolyte material which is formed of a polymer (H) obtained by converting precursor groups in a polymer (F) having structural units (A) based on a perfluoromonomer having a precursor group represented by the formula (g1), structural units (B) represented by the formula (u2), and structural units (C) based on tetrafluoroethylene, wherein the proportion of the structural units (A) is from 8 to 19 mol %, the proportion of the structural units (B) is from 65 to 80 mol %, and the proportion of the structural units (C) is from 1 to 27 mol %, to ion exchange groups.

(Continued)

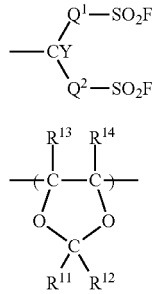

17 Claims, 1 Drawing Sheet

(51) Int. Cl.
*H01B 1/06* (2006.01)
*H01M 8/10* (2016.01)
*H01M 8/02* (2016.01)
*C08L 29/10* (2006.01)
*C08J 5/22* (2006.01)
*C08F 214/18* (2006.01)
*H01B 1/12* (2006.01)
*H01M 4/92* (2006.01)
*H01M 8/1018* (2016.01)

(52) U.S. Cl.
CPC ............. *C08J 5/2237* (2013.01); *C08L 29/10* (2013.01); *H01B 1/06* (2013.01); *H01B 1/122* (2013.01); *H01M 4/926* (2013.01); *H01M 8/02* (2013.01); *H01M 8/10* (2013.01); *H01M 8/1018* (2013.01); *C08J 2327/14* (2013.01); *H01M 2008/1095* (2013.01)

(56) References Cited

U.S. PATENT DOCUMENTS

| | | | | |
|---|---|---|---|---|
| 2009/0110967 | A1* | 4/2009 | Hommura | H01M 8/1023 429/490 |
| 2010/0304271 | A1* | 12/2010 | Hommura | C08F 8/12 429/483 |
| 2010/0314038 | A1* | 12/2010 | Tanuma | H01M 8/1007 156/249 |
| 2011/0027688 | A1 | 2/2011 | Hommura et al. | |
| 2013/0253157 | A1 | 9/2013 | Takami et al. | |
| 2015/0030962 | A1 | 1/2015 | Hommura et al. | |

FOREIGN PATENT DOCUMENTS

| | | |
|---|---|---|
| JP | 2014-507753 | 3/2014 |
| WO | WO 2011/013578 A1 | 2/2011 |
| WO | WO 2013/157395 A1 | 10/2013 |

\* cited by examiner

ELECTROLYTE MATERIAL, LIQUID COMPOSITION AND MEMBRANE/ELECTRODE ASSEMBLY FOR POLYMER ELECTROLYTE FUEL CELL

TECHNICAL FIELD

The present invention relates to an electrolyte material, a liquid composition containing the electrolyte material, and a membrane/electrode assembly for a polymer electrolyte fuel cell containing the electrolyte material in a catalyst layer.

BACKGROUND ART

It is said to be ideal that operation of a polymer electrolyte fuel cell is carried out under conditions where reaction gas (fuel gas and oxidant gas) is kept at a high temperature and in a low humidity, with a view to simplifying a fuel cell system and to reducing costs.

As an electrolyte material for a catalyst layer, capable of providing a membrane/electrode assembly for a polymer electrolyte fuel cell excellent in power generation characteristics under such high temperature and low humidity conditions, the following electrolyte material has been proposed.

An electrolyte material which is formed of a polymer (H) obtained by converting precursor groups in a polymer (F) having structural units (A) based on a perfluoromonomer having two precursor groups (—$SO_2F$ groups) and structural units (B) based on a perfluoromonomer having a five-membered ring to ion exchange groups (—$SO_3^-H^+$), wherein the polymer (H) has an ion exchange capacity of from 1.3 to 2.3 meq/g dry resin (Patent Document 1).

On the other hand, when a fuel cell system is activated, operation under low temperature and high humidity conditions is needed, and therefore the operation is required to be carried out in a wide temperature range and a wide humidity range.

However, the electrolyte material in Patent Document 1 has a high ion exchange capacity and thus has a high water content. Therefore, in a catalyst layer containing the electrolyte material, flooding phenomenon (water clogging phenomenon) is likely to occur under low temperature and high humidity conditions, and the power generation characteristics of the membrane/electrode assembly are thus likely to deteriorate.

In order to suppress the flooding phenomenon in a catalyst layer, the ion exchange capacity of the electrolyte material may be lowered. However, if the ion exchange capacity of the electrolyte material is merely lowered, the power generation characteristics of the membrane/electrode assembly under high temperature and low humidity conditions will deteriorate.

PRIOR ART DOCUMENTS

Patent Documents

Patent Document 1: WO2011/013578

DISCLOSURE OF INVENTION

Technical Problem

The present invention provides a membrane/electrode assembly excellent in power generation characteristics in a wide temperature range and a wide humidity range; an electrolyte material suitable for a catalyst layer of the membrane/electrode assembly; and a liquid composition suitable for forming a catalyst layer of the membrane/electrode assembly.

Solution to Problem

The present invention provides the following.

[1] An electrolyte material which is formed of a polymer (H) obtained by converting precursor groups in the following polymer (F) to ion exchange groups:

Polymer (F): a polymer having structural units (A) based on a perfluoromonomer having a precursor group represented by the following formula (g1), structural units (B) represented by the following formula (u2), and structural units (C) based on tetrafluoroethylene, wherein the proportion of the structural units (A) is from 8 to 19 mol %, the proportion of the structural units (B) is from 65 to 80 mol %, and the proportion of the structural units (C) is from 1 to 27 mol %, in 100 mol % of all structural units:

wherein $Q^1$ is a perfluoroalkylene group which may have an etheric oxygen atom, $Q^2$ is a single bond or a perfluoroalkylene group which may have an etheric oxygen atom, and Y is a fluorine atom or a monovalent perfluoro organic group.

wherein each of $R^{11}$ and $R^{12}$ which are independent of each other, is a fluorine atom or a $C_{1-5}$ perfluoroalkyl group, and each of $R^{13}$ and $R^{14}$ which are independent of each other, is a fluorine atom, a $C_{1-5}$ perfluoroalkyl group or a $C_{1-5}$ perfluoroalkoxy group.

[2] The electrolyte material according to [1], wherein the proportion of the structural units (A) is from 13 to 18 mol %, the proportion of the structural units (B) is from 67 to 78 mol %, and the proportion of the structural units (C) is from 4 to 20 mol %, in 100 mol % of all structural units constituting the polymer (F).

[3] The electrolyte material according to [1] or [2], wherein the following TQ value of the polymer (F) is from 250 to 330° C.:

TQ value: a temperature at which the extrusion rate becomes 100 $mm^3$/sec, when the polymer (F) is subjected to melt-extrusion under an extrusion pressure condition of 2.94 MPa from a nozzle having a length of 1 mm and an inner diameter of 1 mm.

[4] The electrolyte material according to any one of [1] to [3], wherein the ion exchange capacity of the polymer (H) is from 0.7 to 1.29 meq/g dry resin.

[5] The electrolyte material according to any one of [1] to [4], wherein at least one type of structural units (A') obtained by converting precursor groups of the structural units (A) to ion exchange groups is structural units represented by the following formula (u'1):

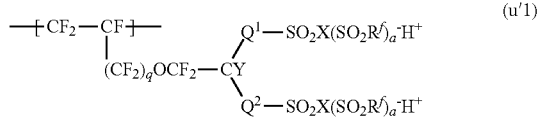

wherein $R^f$ is a perfluoroalkyl group which may have an etheric oxygen atom, X is an oxygen atom, a nitrogen atom or a carbon atom, a=0 when X is an oxygen atom, a=1 when X is a nitrogen atom, a=2 when X is a carbon atom, and q is 0 or 1.

[6] The electrolyte material according to any one of [1] to [5], wherein each of $Q^1$ and $Q^2$ which are independent of each other, is a $C_{1-6}$ perfluoroalkylene group which may have an etheric oxygen atom.

[7] The electrolyte material according to [6], wherein at least one of $Q^1$ and $Q^2$ is a $C_{1-6}$ perfluoroalkylene group having an etheric oxygen atom.

[8] The electrolyte material according to any one of [1] to [7], wherein at least one type of the structural units (B) is structural units represented by the following formula (u2-1):

[9] A liquid composition comprising a dispersion medium and the electrolyte material as defined in any one of [1] to [8], dispersed in the dispersion medium, wherein the dispersion medium contains an organic solvent having a hydroxy group.

[10] The liquid composition according to [9], wherein the electrolyte material as defined in any one of [1] to [8] is contained in a proportion of from 1 to 50 mass %.

[11] A catalyst layer in an electrode of a membrane/electrode assembly for a polymer electrolyte fuel cell, which contains a proton conductive polymer formed of the electrolyte material as defined in any one of [1] to [8].

[12] A membrane/electrode assembly for a polymer electrolyte fuel cell, comprising an anode having a catalyst layer containing a proton conductive polymer, a cathode having a catalyst layer containing a proton conductive polymer, and a polymer electrolyte membrane disposed between the anode and the cathode, wherein the proton conductive polymer contained in the catalyst layer of at least one of the cathode and the anode is the electrolyte material as defined in any one of [1] to [8].

Advantageous Effects of Invention

According to a membrane/electrode assembly using, as a catalyst layer, the electrolyte material of the present invention, it is possible to exhibit excellent power generation characteristics (such as output voltage) in a wide temperature range and a wide humidity range. In particular, it is possible to exhibit excellent power generation characteristics (such as output voltage) even under low temperature (30 to 60° C.) and high humidity (relative humidity of from 60 to 100% RH) conditions and high temperature (61 to 120° C.) and low humidity (relative humidity of from 0 to 50% RH) conditions.

On the other hand, when the proportion of the structural units (A) in the polymer (F) is reduced and the ion exchange capacity of the polymer (H) is thereby lowered so as to improve the power generation characteristics under low temperature and high humidity conditions, the power generation characteristics under high temperature and low humidity conditions are usually deteriorated. However, it is presumed that, according to the present invention, it is possible to suppress the deterioration of the power generation characteristics under high temperature and low humidity conditions, by selecting the structural units (u2) as structural units based on a perfluoromonomer having a five-membered ring and further controlling proportions of the respective structural units to specific ranges.

DESCRIPTION OF EMBODIMENTS

Figure 1:
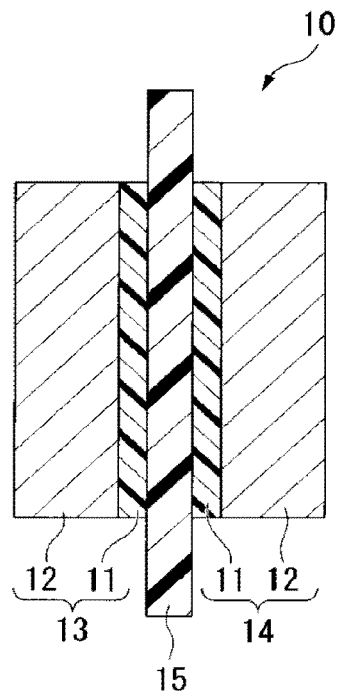
FIG. 1 is a cross-section illustrating one example of a membrane/electrode assembly of the present invention.

In this specification, structural units represented by the formula (u1) will be referred to as structural units (u1). The same applies to structural units represented by other formulae. Further, a monomer represented by the formula (m1) will be referred to as a monomer (m1). The same applies to monomers represented by other formulae. Moreover, a group represented by the formula (g1) will be referred to as a group (g1). The same applies to groups represented by other formulae.

The following definitions of terms apply to this specification and claims.

"A fluoropolymer" means a polymer having some of or all hydrogen atoms bonded to a carbon atom substituted by fluorine atoms.

"Structural units" mean units derived from a monomer, formed by polymerizing the monomer. The structural units may be units directly formed by the polymerization reaction of the monomer, or may be units having part of the units converted to another structure by treating the polymer.

"A perfluoromonomer" means a monomer having all hydrogen atoms bonded to a carbon atom substituted by fluorine atoms.

"An ion exchange group" is a group having $H^+$, a monovalent metal cation, an ammonium ion or the like. The ion exchange group may, for example, be a sulfonic acid group, a sulfonimide group or a sulfonmethide group.

"A precursor group" means a group which can be converted to an ion exchange group by a known treatment, such as hydrolysis treatment or acid-form conversion treatment. As the precursor group, a —$SO_2F$ group may, for example, be mentioned.

<Electrolyte Material>

The electrolyte material of the present invention is formed of a polymer (H) obtained by converting precursor groups of a polymer (F) converted to ion exchange groups.

(Polymer (F))

The polymer (F) is a polymer having specific structural units (A), specific structural units (B), specific structural units (C) and, as the case requires, other structural units (D).

Structural units (A):

The structural units (A) are structural units based on a perfluoromonomer having a group (g1) which is a precursor group of an ion exchange group:

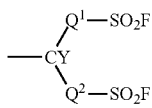
(g1)

$Q^1$ is a perfluoroalkylene group which may have an etheric oxygen atom.

$Q^2$ is a single bond or a perfluoroalkylene group which may have an etheric oxygen atom.

When the perfluoroalkylene group for $Q^1$ or $Q^2$ has an etheric oxygen atom, the number of such oxygen atom may be one or may be two or more. Further, such oxygen atom may be inserted between carbon-carbon bond in the perfluoroalkylene group, or may be inserted into a terminal of the carbon-carbon bond.

The perfluoroalkylene group may be linear or may be branched, and is preferably linear.

The number of carbon atoms in the perfluoroalkylene group is preferably from 1 to 6, more preferably from 1 to 4. When the number of carbon atoms is at most 6, the boiling point of the monomer (a) as the raw material will be low, whereby purification by distillation becomes easy. Further, when the number of carbon atoms is at most 6, it is possible to prevent a decrease in the ion exchange capacity of the fluoropolymer (H), and to prevent a decrease in the proton conductivity.

$Q^2$ is preferably a $C_{1-6}$ perfluoroalkylene group which may have an etheric oxygen atom. When $Q^2$ is a $C_{1-6}$ perfluoroalkylene group which may have an etheric oxygen atom, the stability of the power generation characteristics will be excellent when a polymer electrolyte fuel cell is operated over a long period of time, as compared with a case where $Q^2$ is a single bond.

At least one of $Q^1$ and $Q^2$ is preferably a $C_{1-6}$ perfluoroalkylene group having an etheric oxygen atom. The monomer (a) having such a $C_{1-6}$ perfluoroalkylene group having an etheric oxygen atom, can be prepared without via a fluorination reaction with fluorine gas, whereby the yield is good, and the production is easy.

Y is a fluorine atom or a monovalent perfluoro organic group. Y is preferably a fluorine atom or a $C_{1-6}$ linear perfluoroalkyl group which may have an etheric oxygen atom.

The structural units (A) are preferably structural units (u1) since a membrane/electrode assembly can exhibit more excellent power generation characteristics either under low temperature and high humidity conditions and under high temperature and low humidity conditions.

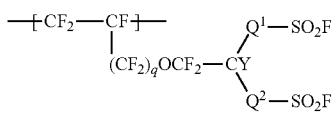
(u1)

$Q^1$, $Q^2$ and Y are as described in the group (g1). q is 0 or 1.

As the structural units (u1), structural units (u1-1) to (u1-3) are preferred, and the structural units (u1-1) are particularly preferred, since it is thereby easy to produce the polymer (H), and industrial implementation is easy.

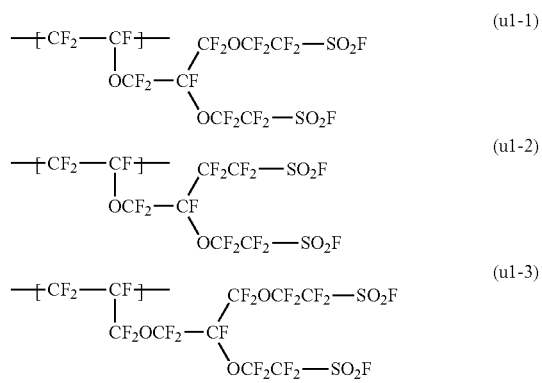

Structural Units (B):

The structural units (B) are structural units (u2).

(u2)

Each of $R^{11}$ and $R^{12}$ which are independent of each other, is a fluorine atom or a $C_{1-5}$ perfluoroalkyl group.

Each of $R^{13}$ and $R^{14}$ which are independent of each other, is a fluorine atom, a $C_{1-5}$ perfluoroalkyl group or a $C_{1-5}$ perfluoroalkoxy group. In view of high polymerization reactivity of the after-mentioned monomer (m2), it is preferred that at least one of $R^{13}$ and $R^{14}$ is a fluorine atom, and it is more preferred that both of $R^{13}$ and $R^{14}$ are fluorine atoms.

The perfluoroalkyl group and the perfluoroalkoxy group may be linear or branched, but are preferably linear.

The structural units (u2) may, for example, be structural units (u2-1) to (u2-8), and structural units (u2-1) are particularly preferred since a membrane/electrode assembly can exhibit more excellent power generation characteristics even under low temperature and high humidity conditions or high temperature and low humidity conditions.

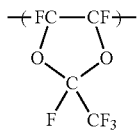
(u2-3)

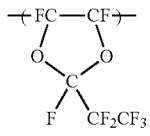
(u2-4)

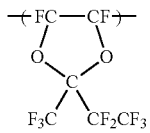
(u2-5)

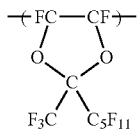
(u2-6)

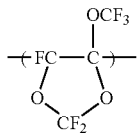
(u2-7)

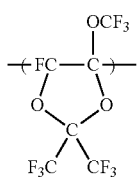
(u2-8)

The structural units (C) are structural units based on tetrafluoroethylene.

Other structural units (D) are structural units based on the after-mentioned other monomer (d).

The proportion of the structural units (A) is from 8 to 19 mol %, more preferably from 13 to 18 mol %, furthermore preferably from 14 to 18 mol %, in 100 mol % of all structural units constituting the polymer (F). When the proportion of the structural units (A) is at least the above lower limit, the solubility or the dispersibility of the polymer (H) becomes good, and therefore the after-mentioned liquid composition is easily prepared. When the proportion of the structural units (A) is at most the above upper limit, the flooding phenomenon in a catalyst layer can be suppressed, and therefore the membrane/electrode assembly can exhibit excellent power generation characteristics even under low temperature and high humidity conditions.

The proportion of the structural units (B) is from 65 to 80 mol %, more preferably from 67 to 78 mol %, furthermore preferably from 68 to 75 mol %, in 100 mol % of all structural units constituting the polymer (F). When the proportion of the structural units (B) is at least the above lower limit, the membrane/electrode assembly can exhibit excellent power generation characteristics even under high temperature and low humidity conditions. When the proportion of the structural units (B) is at most the above upper limit, a glass transition point of the polymer may not be too high, the flooding phenomenon in a catalyst layer can be suppressed, and therefore the membrane/electrode assembly can exhibit excellent power generation characteristics even under low temperature and high humidity conditions.

The proportion of the structural units (C) is from 1 to 27 mol %, more preferably from 4 to 20 mol %, furthermore preferably from 7 to 18 mol %, in 100 mol % of all structural units constituting the polymer (F). When the proportion of the structural units (C) is at least the above lower limit, it is possible to impart crystallinity due to tetrafluoroethylene, whereby mechanical strength will be excellent. When the proportion of the structural units (C) is at most the above upper limit, the solubility or the dispersibility of the polymer (H) becomes good, and therefore the after-mentioned liquid composition is easily prepared.

The proportion of other structural units (D) is preferably at most 30 mol %, more preferably at most 15 mol %, furthermore preferably at most 10 mol %, in 100 mol % of all structural units constituting the polymer (F). When the proportion of other structural units (D) is at most the above upper limit, the effect of the present invention is hardly impaired.

TQ Value of Polymer (F):

The TQ value of the polymer (F) is preferably from 250 to 330° C., more preferably from 255 to 300° C., furthermore preferably from 260 to 290° C. When the TQ value of the polymer (F) is at least the above lower limit value, the polymer (H) has a sufficient molecular weight, and is also excellent in mechanical strength. When the TQ value of the polymer (F) is at most the above upper limit, the solubility or the dispersibility of the polymer (H) becomes good, and the after-mentioned liquid composition is easily prepared.

The TQ value is an index of a molecular weight of a polymer, and is a temperature at which the extrusion rate becomes 100 mm$^3$/sec, when the polymer (F) is subjected to melt-extrusion under an extrusion pressure condition of 2.94 MPa from a nozzle having a length of 1 mm and an inner diameter of 1 mm.

(Production of Polymer (F))

The polymer (F) is produced by polymerizing a specific monomer (a), a specific monomer (b), a specific monomer (c) and, as the case requires, other monomer (d).

Monomer (a):

The monomer (a) is a perfluoromonomer having the group (g1).

The monomer (a) is preferably a monomer (m1), since a membrane/electrode assembly can exhibit more excellent power generation characteristics even under low temperature and high humidity conditions or high temperature and low humidity conditions.

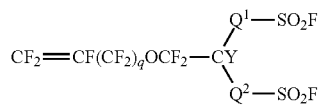
(m-1)

$Q^1$, $Q^2$, Y and q are as described in the structural units (u1).

As the monomer (m1), monomers (m1-1) to (m1-3) are preferred, and the monomer (m1-1) is particularly preferred, since it is thereby easy to produce the polymer (H), and industrial implementation is easy.

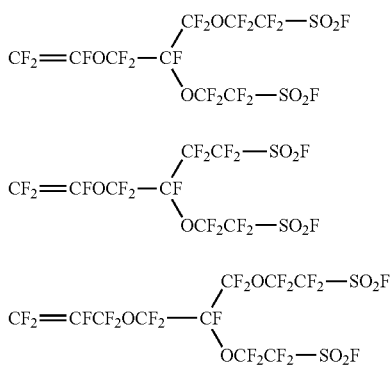

The monomer (m1) can be synthesized by a method as described in e.g. WO2007/013533 or JP-A-2008-202039.

The monomer (b) is a monomer (m2).

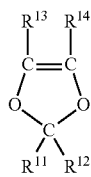

$R^{11}$ to $R^{14}$ are as described in the structural units (u2).

As the monomer (m2), monomers (m2-1) to (m2-8) may, for example, be mentioned, and from the viewpoint that a membrane/electrode assembly can exhibit more excellent power generation characteristics even under low temperature and high humidity conditions or high temperature and low humidity conditions, the monomer (m2-1) is particularly preferred.

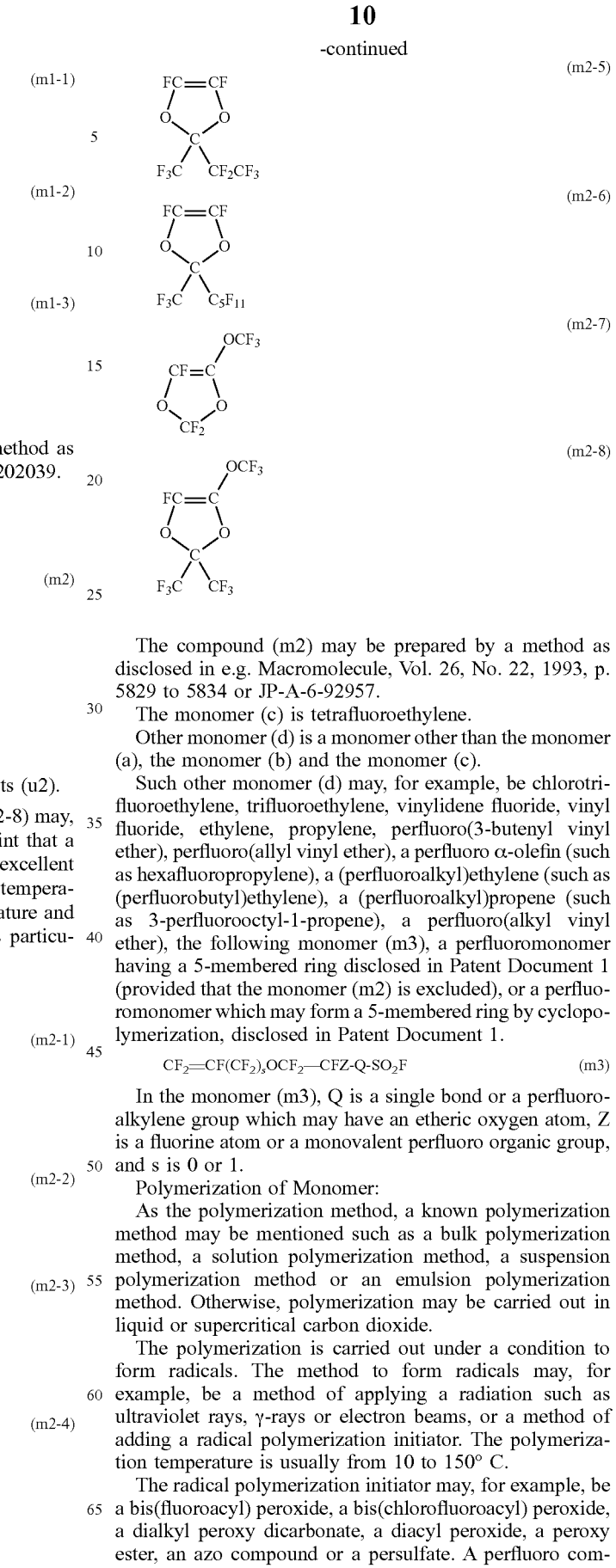

The compound (m2) may be prepared by a method as disclosed in e.g. Macromolecule, Vol. 26, No. 22, 1993, p. 5829 to 5834 or JP-A-6-92957.

The monomer (c) is tetrafluoroethylene.

Other monomer (d) is a monomer other than the monomer (a), the monomer (b) and the monomer (c).

Such other monomer (d) may, for example, be chlorotrifluoroethylene, trifluoroethylene, vinylidene fluoride, vinyl fluoride, ethylene, propylene, perfluoro(3-butenyl vinyl ether), perfluoro(allyl vinyl ether), a perfluoro α-olefin (such as hexafluoropropylene), a (perfluoroalkyl)ethylene (such as (perfluorobutyl)ethylene), a (perfluoroalkyl)propene (such as 3-perfluorooctyl-1-propene), a perfluoro(alkyl vinyl ether), the following monomer (m3), a perfluoromonomer having a 5-membered ring disclosed in Patent Document 1 (provided that the monomer (m2) is excluded), or a perfluoromonomer which may form a 5-membered ring by cyclopolymerization, disclosed in Patent Document 1.

$$CF_2=CF(CF_2)_sOCF_2-CFZ-Q-SO_2F \quad (m3)$$

In the monomer (m3), Q is a single bond or a perfluoroalkylene group which may have an etheric oxygen atom, Z is a fluorine atom or a monovalent perfluoro organic group, and s is 0 or 1.

Polymerization of Monomer:

As the polymerization method, a known polymerization method may be mentioned such as a bulk polymerization method, a solution polymerization method, a suspension polymerization method or an emulsion polymerization method. Otherwise, polymerization may be carried out in liquid or supercritical carbon dioxide.

The polymerization is carried out under a condition to form radicals. The method to form radicals may, for example, be a method of applying a radiation such as ultraviolet rays, γ-rays or electron beams, or a method of adding a radical polymerization initiator. The polymerization temperature is usually from 10 to 150° C.

The radical polymerization initiator may, for example, be a bis(fluoroacyl) peroxide, a bis(chlorofluoroacyl) peroxide, a dialkyl peroxy dicarbonate, a diacyl peroxide, a peroxy ester, an azo compound or a persulfate. A perfluoro compound such as a bis(fluoroacyl) peroxide is preferred from such a viewpoint that the polymer (F) substantially free from unstable terminal groups is thereby obtainable.

A solvent to be used for the solution polymerization method is preferably a solvent having a boiling point of from 20 to 350° C., more preferably a solvent having a boiling point of from 40 to 150° C. Such a solvent may, for example, be a perfluorotrialkylamine (such as perfluorotributylamine), a perfluorocarbon (such as perfluorohexane or perfluorooctane), a hydrofluorocarbon (such as 1H,4H-perfluorobutane or 1H-perfluorohexane), a hydrochlorofluorocarbon (such as 3,3-dichloro-1,1,1,2,2-pentafluoropropane or 1,3-dichloro-1,1,2,2,3-pentafluoropropane) or a hydrofluoroether (such as $CF_3CH_2OCF_2CF_2H$).

In the solution polymerization method, monomers, a radical polymerization initiator, etc. are added to the solvent to let radicals form in the solvent thereby to carry out polymerization of the monomers. The monomers and the polymerization initiator may be added all at once, sequentially or continuously.

In the suspension polymerization method, water is used as a dispersion medium, and in the dispersion medium, monomers, a non-ionic radical initiator, etc. are added to let radicals form in the dispersion medium thereby to carry out polymerization of the monomers.

The non-ionic radical initiator may, for example, be a bis(fluoroacyl) peroxide, a bis(chlorofluoroacyl) peroxide, a dialkylperoxy dicarbonate, a diacyl peroxide, a peroxy ester, a dialkyl peroxide, a bis(fluoroalkyl) peroxide or an azo compound.

To the dispersion medium, the above-mentioned solvent as an assisting agent; a surfactant as a dispersion stabilizer to prevent agglomeration of suspended particles; a hydrocarbon compound (such as hexane or methanol) as a molecular-weight controlling agent, etc., may be added.

(Polymer (H))

The polymer (H) is a polymer obtained by converting precursor groups in the polymer (F) to ion exchange groups, and is a polymer having specific structural units (A'), the specific structural units (B), the specific structural units (C) and as the case requires, other structural units (D).

Structural Units (A'):

The structural units (A') are structural units obtained by converting precursor groups of the structural units (A) to ion exchange groups. Such an ion exchange group is preferably a group (g'1).

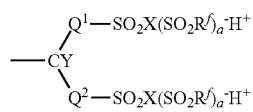

$Q^1$, $Q^2$ and Y are as described in the group (g1).

$R^f$ is a linear or branched perfluoroalkyl group which may have an etheric oxygen atom. The number of carbon atoms in the perfluoroalkyl group is preferably from 1 to 8, more preferably from 1 to 6. When the group (g'1) has at least two $R^f$, $R^f$ may be the same groups or different groups, respectively.

X is an oxygen atom, a nitrogen atom or a carbon atom, and a=0 when X is an oxygen atom, a=1 when X is a nitrogen atom, and a=2 when X is a carbon atom.

As $-SO_2X(SO_2R^f)_a^-H^+$ in the group (g'1), a sulfonic acid group ($-SO_3^-H^+$ group), a sulfonimide group ($-SO_2N$ ($SO_2R^f)^-H^+$ group) or a sulfonemethide group ($-SO_2C$ $(SO_2R^f)_2)^-H^+$ group) may be mentioned.

The structural units (A') are preferably structural units (u'1) since a membrane/electrode assembly can exhibit more excellent power generation characteristics even under low temperature and high humidity conditions or high temperature and low humidity conditions.

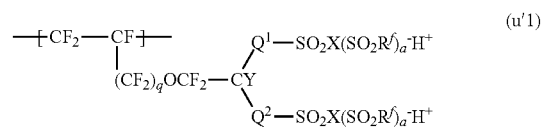

$Q^1$, $Q^2$, Y and q are as described in the structural units (u1). $R^f$, X and a are as described in the group (g'1).

The structural units (u'1) are preferably structural units (u'1-1) to (u'1-3), particularly preferably structural units (u'1-1), since it is thereby easy to produce the polymer (H), and industrial implementation is easy.

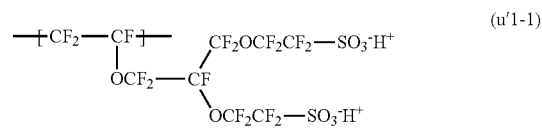

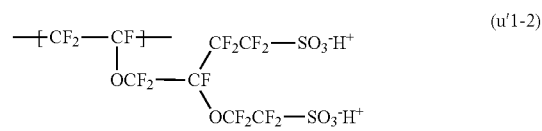

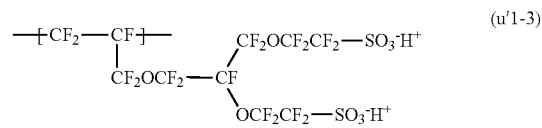

The structural units (B) are as described in the polymer (F).

The structural units (C) are as described in the polymer (F).

Other structural units (D) are as described in the polymer (F), provided that when the polymer (F) has structural units based on the monomer (m3), precursor groups in the structural units are converted to ion exchange groups at the time of producing the polymer (H).

Ion Exchange Capacity:

The ion exchange capacity of the polymer (H) is preferably from 0.7 to 1.29 meq/g dry resin, more preferably from 0.93 to 1.23 meq/g dry resin, furthermore preferably from 1.03 to 1.23 meq/g dry resin. When the ion exchange capacity is at least the above lower limit, the polymer (H) has high electrical conductivity and accordingly when it is used as an electrolyte material for a catalyst layer of a polymer electrolyte fuel cell, sufficient cell output will be obtained. When the ion exchange capacity is at most the above upper limit, flooding phenomenon in a catalyst layer can be further suppressed, and therefore a membrane/electrode assembly can exhibit more excellent power generation characteristics even under low temperature and high humidity conditions.

(Production of Polymer (H))

The polymer (H) is produced by converting precursor groups in the polymer (F) to ion exchange groups.

As a method of converting —SO$_2$F groups to sulfonic acid groups (—SO$_3^-$H$^+$ groups), the following method (i) may be mentioned, and as a method of converting —SO$_2$F groups to sulfonimide groups (—SO$_2$N(SO$_2$R$^f$)$^-$H$^+$ groups), the following method (ii) may be mentioned.

(i) A method of hydrolyzing —SO$_2$F groups in the polymer (F) to a sulfonate salt and then converting the sulfonate salt to acid-form to obtain sulfonic acid groups.

(ii) A method of imidizing —SO$_2$F groups in the polymer (F) to salt-form sulfonimide groups, followed by conversion to acid-form to form acid-form sulfonimide groups.

Method (i):

The hydrolysis is carried out, for example, by contacting the polymer (F) with a basic compound in a solvent. The basic compound may, for example, be sodium hydroxide or potassium hydroxide. The solvent may, for example, be water or a mixed solvent of water with a polar solvent. The polar solvent may, for example, be an alcohol (such as methanol or ethanol) or dimethylsulfoxide.

The conversion to acid-form may be carried out, for example, by contacting the polymer having a sulfonate salt with an aqueous solution of hydrochloric acid, sulfuric acid or the like. The hydrolysis and conversion to acid-form are carried out usually at a temperature of from 0 to 120° C.

Method (ii):

As the imidation, the following methods may, for example, be mentioned.

(ii-1) A method of reacting —SO$_2$F groups with R$^f$SO$_2$NHM.

(ii-2) A method of reacting —SO$_2$F groups with R$^f$SO$_2$NH$_2$ in the presence of an alkali metal hydroxide, an alkali metal carbonate, MF, ammonia or a primary to tertiary amine.

(ii-3) A method of reacting —SO$_2$F groups with R$^f$SO$_2$NMSi(CH$_3$)$_3$.

Here, M is an alkali metal or a primary to quaternary ammonium.

The conversion to acid-form is carried out by treating the polymer having salt-form sulfonimide groups with an acid (such as sulfuric acid, nitric acid or hydrochloric acid).

<Liquid Composition>

The liquid composition of the present invention is a composition comprising a dispersion medium and the electrolyte material of the present invention dispersed in the dispersion medium.

The dispersion medium contains an organic solvent having a hydroxy group.

The organic solvent having a hydroxy group may, for example, be methanol, ethanol, 1-propanol, 2-propanol, 2,2,2-trifluoroethanol, 2,2,3,3,3-pentafluoro-1-propanol, 2,2,3,3,-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6-nonafluoro-1-hexanol, or 3,3,4,4,5,5,6,6,7,7,8,8-tridecafluoro-1-octanol.

As the organic solvent having a hydroxy group, one type may be used alone, or two or more types may be used as mixed.

The dispersion medium preferably contains water.

The proportion of water is preferably from 10 to 99 mass %, more preferably from 40 to 99 mass %, in the dispersion medium (100 mass %). Dispersibility of the electrolyte material in the dispersion medium can be improved by increasing the proportion of water.

The proportion of the organic solvent having a hydroxy group is preferably from 1 to 90 mass %, more preferably from 1 to 60 mass %, in the dispersion medium (100 mass %).

The proportion of the electrolyte material is preferably from 1 to 50 mass %, more preferably from 3 to 30 mass %, in the liquid composition (100 mass %).

The liquid composition may be prepared in accordance with the preparation method as described in e.g. JP-B-4-35226, JP-A-2001-504872, JP-A-2005-82749, WO2006/38928 or JP-A-2004-519296.

A specific method of preparing the liquid composition may be a method of applying shearing such as stirring to the electrolyte material in the dispersion medium under atmospheric pressure or in a sealed state in an autoclave or the like.

The preparation temperature is preferably from 0 to 250° C., more preferably from to 150° C. As the case requires, shearing such as ultrasonic waves may be applied.

Further, in the case of applying shearing such as stirring to a mixed solution obtained by mixing the electrolyte material with an organic solvent and water to prepare the liquid composition, the shearing such as stirring may be applied to a mixed solution obtained by adding all of the organic solvent and water to the electrolyte material, or the organic solvent and water may be mixed to the electrolyte material dividedly in a plurality of times, and the shearing such as stirring may be applied inbetween. For example, the shearing such as stirring may be applied to a mixture having a part of the organic solvent and a part of water added to the electrolyte material and then the remainder of the organic solvent and water is added to the mixture, and the shearing such as stirring is applied again thereto. Otherwise, it is also possible that shearing such as stirring is applied after adding only the organic solvent to the electrolyte material, and then, only water is added, followed by applying the shearing such as stirring again.

The liquid composition of the present invention is suitably used for forming a catalyst layer of a membrane/electrode assembly as described hereinafter.

<Membrane/Electrode Assembly>

FIG. 1 is a cross-section illustrating one example of a membrane/electrode assembly for a polymer electrolyte fuel cell (hereinafter, referred to as membrane/electrode assembly) of the present invention. A membrane/electrode assembly 10 comprises an anode 13 having a catalyst layer 11 and a gas diffusion layer 12, a cathode 14 having a catalyst layer 11 and a gas diffusion layer 12, and a polymer electrolyte membrane 15 disposed between the anode 13 and the cathode 14 in a state where it is in contact with the catalyst layers 11.

(Catalyst Layer)

The catalyst layer 11 is a layer containing a catalyst and a proton conductive polymer.

The catalyst may be a supported catalyst having platinum or a platinum alloy supported on a carbon carrier. The carbon carrier may, for example, be a carbon black powder.

The proton conductive polymer may be the electrolyte material of the present invention or a known electrolyte material. The proton conductive polymer contained in the catalyst layer of at least one of the cathode and the anode is the electrolyte material of the present invention. It is more preferred that the proton conductive polymer contained in the catalyst layer of the cathode is the electrolyte material of the present invention.

The catalyst layer 11 may contain a water-repellent agent with a view to increasing the effect to suppress flooding phenomenon. The water-repellent agent may, for example, be a tetrafluoroethylene/hexafluoropropylene copolymer, a tetrafluoroethylene/perfluoro(alkyl vinyl ether) copolymer or polytetrafluoroethylene.

The water-repellent agent is preferably a fluoropolymer soluble in a solvent, from such a viewpoint that the water repellent treatment of the catalyst layer 11 is easy. The amount of the water-repellent agent is preferably from 0.01 to 30 mass %, more preferably from 0.05 to 10 mass %, in the catalyst layer (100 mass %).

As a method of forming the catalyst layer 11, the following methods may be mentioned.

(i) A method of applying a fluid for forming a catalyst layer on the polymer electrolyte membrane 15, the gas diffusion layer 12 or a carbon layer 16, followed by drying.

(ii) A method of applying a fluid for forming a catalyst layer on a substrate film, followed by drying to form a catalyst layer 11, and transferring the catalyst layer 11 to the polymer electrolyte membrane 15.

The fluid for forming a catalyst layer is a fluid comprising the electrolyte material and the catalyst dispersed in a dispersion medium. The fluid for forming a catalyst layer may be prepared, for example, by mixing the liquid composition of the present invention with a dispersion of the catalyst.

(Gas Diffusion Layer)

The gas diffusion layer 12 has a function to uniformly diffuse a gas into the catalyst layer 11 and a function as a current collector. The gas diffusion layer 12 may, for example, be carbon paper, carbon cloth or carbon felt. The gas diffusion layer 12 is preferably subjected to water repellent treatment e.g. with polytetrafluoroethylene.

(Carbon Layer)

Figure 2:
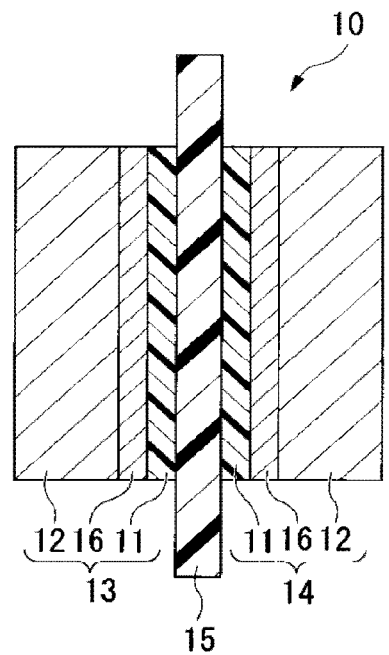
FIG. 2 is a cross-section illustrating another example of a membrane/electrode assembly of the present invention.

The membrane/electrode assembly 10 may have a carbon layer 16 between the catalyst layer 11 and the gas diffusion layer 12 as shown in FIG. 2. By disposing the carbon layer 16, the gas diffusion properties on the surface of the catalyst layer 11 will be improved, and the power generation characteristics of the membrane/electrode assembly 10 will be remarkably improved.

The carbon layer 16 is a layer containing carbon and a nonionic fluorinated polymer.

As the carbon, carbon nanofibers having a fiber diameter of from 1 to 1,000 nm and a fiber length of at most 1,000 µm are preferred.

The nonionic fluorinated polymer may, for example, be polytetrafluoroethylene.

(Polymer Electrolyte Membrane)

The polymer electrolyte membrane 15 is a membrane containing a proton conductive polymer.

The proton conductive polymer may be the electrolyte membrane of the present invention or a known electrolyte material. The known electrolyte material may, for example, be a polymer obtained by converting a —$SO_2F$ group in a polymer having structural units based on the monomer (m3) and structural units based on TFE to a sulfonic acid group; or a polymer obtained by converting a —$SO_2F$ group in a polymer having structural units based on the monomer (m1) and structural units based on TFE to a sulfonic acid group.

The polymer electrolyte membrane 15 can be formed, for example, by a method (a casting method) wherein a liquid composition of the electrolyte material is applied on a substrate film or the catalyst layer 11, followed by drying.

The liquid composition is a dispersion having the electrolyte material dispersed in a dispersion medium containing an organic solvent having a hydroxy group and water.

In order to stabilize the polymer electrolyte membrane 15, it is preferred to carry out heat treatment. The temperature for the heat treatment is preferably from 130 to 200° C., more preferably from 150 to 180° C., although it depends also on the type of the electrolyte material. When the temperature for the heat treatment is at least 130° C., the electrolyte material will not excessively contain water. When the temperature for the heat treatment is at most 200° C., heat decomposition of ion exchange groups may be suppressed, and a decrease in the proton conductivity of the polymer electrolyte membrane 15 may be suppressed.

The polymer electrolyte membrane 15 may be treated with an aqueous hydrogen peroxide solution as the case requires.

The polymer electrolyte membrane 15 may be reinforced by a reinforcing material. The reinforcing material may, for example, be a porous body, fibers, woven fabric or nonwoven fabric. The material for the reinforcing material may, for example, be polytetrafluoroethylene, a tetrafluoroethylene/hexafluoropropylene copolymer, a tetrafluoroethylene/perfluoro(alkyl vinyl ether) copolymer, polyethylene, polypropylene or polyphenylene sulfide.

The polymer electrolyte membrane 15 may contain at least one type of atoms selected from the group consisting of cerium and manganese in order to further improve the durability. Cerium and manganese will decompose hydrogen peroxide which is a substance to cause deterioration of the polymer electrolyte membrane 15. Such cerium or manganese is preferably present in the form of ions in the polymer electrolyte membrane 15, and so long as it is present in the form of ions, it may be present in any state in the polymer electrolyte membrane 15.

The polymer electrolyte membrane 15 may contain silica or a hetero polyacid (such as zirconium phosphate, phosphorus molybdic acid or phosphorus tungstic acid) as a water retention agent to prevent drying.

(Process for Producing Membrane/Electrode Assembly)

The membrane/electrode assembly 10 is produced, for example, by the following method.

(i) A method of forming catalyst layers 11 on a polymer electrolyte membrane 15 to form a membrane/catalyst layer assembly, and sandwiching such a membrane/catalyst layer assembly between gas diffusion layers 12.

(ii) A method of forming a catalyst layer 11 on a gas diffusion layer 12 to form electrodes (anode 13 and cathode 14), and sandwiching a polymer electrolyte membrane 15 between such electrodes.

In a case where the membrane/electrode assembly 10 has a carbon layer 16, the membrane/electrode assembly 10 is produced, for example, by the following method.

(i) A method of applying a dispersion containing carbon and a nonionic fluoropolymer on a substrate film, followed by drying to form a carbon layer 16, forming a catalyst layer 11 on the carbon layer 16, bonding such catalyst layers 11 to a polymer electrolyte membrane 15, separating the substrate films to form a membrane/catalyst layer assembly having the carbon layers 16, and sandwiching such a membrane/catalyst layer assembly between gas diffusion layers 12. (ii) A method of applying a dispersion containing carbon and a nonionic fluoropolymer on a gas diffusion layer 12, followed by drying to form a carbon layer 16, and sandwiching a membrane/catalyst layer assembly having catalyst layers 11 formed on a polymer electrolyte membrane 15 between the gas diffusion layers 12 each having the carbon layer 16.

<Polymer Electrolyte Fuel Cell>

The membrane/electrode assembly of the present invention is used for a polymer electrolyte fuel cell. A polymer electrolyte fuel cell is produced, for example, by sandwiching a membrane/electrode assembly between two separators to form a cell, and stacking a plurality of such cells.

As a separator, an electrically conductive carbon plate having grooves formed to constitute flow paths for a fuel gas or an oxidant gas containing oxygen (such as air or oxygen) may, for example, be mentioned.

As a type of the polymer electrolyte fuel cell, a hydrogen/oxygen type fuel cell or a direct methanol type fuel cell (DMFC) may, for example, be mentioned. Methanol or a methanol aqueous solution to be used as a fuel for DMFC may be a liquid feed or a gas feed.

EXAMPLES

Now, the present invention will be described in detail with reference to Examples. However, it should be understood that the present invention is by no means restricted to such specific Examples. Ex. 1 to 5 and Ex. 11 to 15 are Examples of the present invention, and Ex. 6 to 10, 16 to 18 and 20 are Comparative Examples.

(Proportions of Structural Units)

The proportions of the structural units in the polymer (F) were obtained from the measurement results of $^{19}$F-NMR regarding the polymer (F).

(TQ Value)

Using Flow Tester CFT-500A (manufactured by Shimadzu Corporation) provided with a nozzle having a length of 1 mm and an inner diameter of 1 mm, the extrusion rate of the polymer (F) was measured by changing a temperature under an extrusion pressure of 2.94 MPa, whereby the temperature (TQ value) at which the melt volume rate became 100 mm$^3$/sec was obtained.

(Ion Exchange Capacity)

The polymer (H) was put in a globe box and left to stand in an atmosphere into which dry nitrogen was brown for 24 hours to be dried. The dry mass of the polymer (H) was measured in the globe box.

The polymer (H) was dipped in a 2 mol/L sodium chloride aqueous solution and left to stand at 60° C. for one hour, and then cooled to room temperature. The sodium chloride aqueous solution in which the polymer (H) was dipped was titrated with a 0.5 mol/L sodium hydroxide aqueous solution, whereby the ion exchange capacity of the polymer (H) was obtained.

(Power Generation Characteristics 1)

While the temperature of the membrane/electrode assembly was maintained at 60° C., hydrogen (utilization ratio: 50%) was supplied to the anode and air (utilization ratio: 50%) was supplied to the cathode, under a pressure of 175 kPa (absolute pressure). Hydrogen and air were supplied under a relative humidity of 100% RH, the cell voltage when the current density was 1.5 A/cm$^2$ was recorded, and evaluation was carried out on the basis of the following standard.

○ (Excellent): Cell voltage was at least 0.5 V.

Δ (Good): Cell voltage was at least 0.4 V and less than 0.5 V.

x (Poor): Cell voltage was less than 0.4 V.

(Power Generation Characteristics 2)

While the temperature of the membrane/electrode assembly was maintained at 80° C., hydrogen (utilization ratio: 50%) was supplied to the anode and air (utilization ratio: 50%) was supplied to the cathode, under a pressure of 175 kPa (absolute pressure). Hydrogen and air were supplied under no humidification, the cell voltage when the current density was 1.0 A/cm$^2$ was recorded, and evaluation was carried out on the basis of the following standard.

○ (Excellent): Cell voltage was at least 0.6 V.

Δ (Good): Cell voltage was at least 0.5 V and less than 0.6 V.

x (Poor): Cell voltage was less than 0.5 V.

(Abbreviation)

BSVE-2E: Monomer (m1-1),
PDD: Monomer (m2-1)
TFE: Tetrafluoroethylene,
PSVE: Monomer (m3-1),
MMD: Monomer (m4-1).

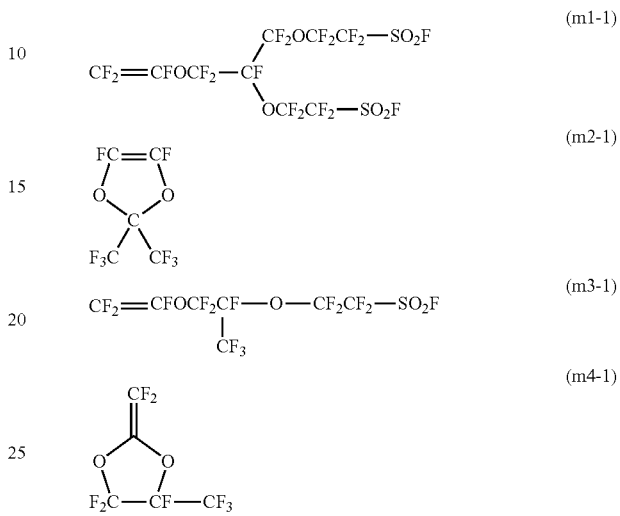

PFB: $(C_3F_7COO)_2$, IPP: $((CH_3)_2CHOCOO)_2$,
C6H: $C_6F_{13}H$, 225cb: $CCIF_2CF_2CHCIF$

Ex. 1

Into a stainless steel autoclave having an internal capacity of 2,575 mL, 1,076 g of BSVE-2E was charged under reduced pressure while cooling it with ice water, followed by deaeration. 328 g of PDD was charged. The temperature was raised to 24° C., and 0.1 MPa of nitrogen gas was introduced thereto. Then, no change of the pressure was confirmed, and then 54.0 g of TFE was charged thereto. 13.64 g of a 3.1 mass % solution of PFB dissolved in C6H was added under pressure with nitrogen gas, and then addition line was washed with 4 g of C6H. After 24 hours from the initiation of polymerization, the autoclave was cooled to terminate the polymerization reaction, and the gas in the system was purged to obtain a solution of a polymer (F-1).

The solution of the polymer (F-1) was diluted with C6H and poured into a mixed solvent of C6H/methanol=80/20 (mass ratio) to agglomerate the polymer (F-1), followed by filtration. The polymer (F-1) was washed 5 times with a mixed solvent of C6H/methanol=70/30 (mass ratio). The polymer was vacuum-dried at 80° C. overnight. The yield of the polymer (F-1) is shown in Table 1. The proportions of the respective structural units of the polymer (F-1) and the TQ value are shown in Table 2.

The polymer (F-1) was dipped in an aqueous solution containing 20 mass % of methanol and 15 mass % of potassium hydroxide for 40 hours, whereby —SO$_2$F groups in the polymer (F-1) were hydrolyzed and converted to —SO$_3$K groups. Then, the polymer was dipped in a 3 mol/L hydrochloric acid aqueous solution for two hours.

The hydrochloric acid aqueous solution was changed, and the same treatment was further carried out four times to obtain a polymer (H-1) formed by converting the —SO$_3$K groups to sulfonic acid groups in the polymer. The polymer (H-1) was sufficiently washed with ultrapure water. The ion exchange capacity of the polymer (H-1) is shown in Table 2.

To the polymer (H-1), a mixed dispersion medium of 1-propanol/water=50/50 (mass ratio) was added to adjust a solid content concentration to 8 mass %, followed by stirring using an autoclave at 105° C. for 8 hours to obtain a liquid composition (L-1) having the polymer (H-1) dispersed in the dispersion medium.

Ex. 2

Into a stainless steel autoclave having an internal capacity of 230 mL, 94.26 g of BSVE-2E and 35.48 g of PDD were charged, followed by sufficient freeze deaeration with liquid nitrogen. 3.90 g of TFE was charged, and then the temperature was raised to 28° C. Then, no change of the pressure was confirmed, and then 0.1 MPa of nitrogen gas was introduced. 1.26 g of a 3.1 mass % solution of PFB dissolved in C6H was added under pressure with nitrogen gas, and then an addition line was washed with 2 g of C6H. After the stirring was carried out for 24 hours from the initiation of polymerization, the autoclave was cooled to terminate the reaction, and gas in the system was purged to obtain a solution of a polymer (F-2).

The solution of the polymer (F-2) was diluted with C6H and poured into a mixed solvent of C6H/methanol=80/20 (mass ratio) to agglomerate the polymer (F-2), followed by filtration. The polymer was washed three times with a mixed solvent of C6H/methanol=70/30 (mass ratio). The polymer was dried under reduced pressure (degree of reduced pressure: 1 mmHg) overnight at 80° C. The yield of the polymer (F-2) is shown in Table 1. The proportions of the respective structural units and the TQ value of the polymer (F-2) are shown in Table 2.

A polymer (H-2) was obtained from the polymer (F-2) in the same manner as in Ex. 1. The ion exchange capacity of the polymer (H-2) is shown in Table 2.

A liquid composition (L-2) was obtained from the polymer (H-2) in the same manner as in Ex. 1.

Ex. 3 to 5

Polymers (F-3), (F-4) and (F-5) are obtained in the same manner as in Ex. 2 except that amounts to be charged and temperatures are changed as shown in Table 1. The yields of the polymers (F-3), (F-4) and (F-5) are shown in Table 1. Proportions of the respective structural units and TQ values of the polymers (F-3), (F-4) and (F-5) are shown in Table 2.

Polymers (H-3), (H-4) and (H-5) are obtained from the polymers (F-3), (F-4) and (F-5), in the same manner as in Ex. 1. The ion exchange capacities of the polymers (H-3), (H-4) and (H-5) are shown in Table 2.

Liquid compositions (L-3), (L-4) and (L-5) are obtained from the polymers (H-3), (H-4) and (H-5), in the same manner as in Ex. 1.

Ex. 6

Into a stainless steel autoclave having an internal capacity of 125 mL, 11.71 g of PDD, 95.15 g of BSVE-2E and 33 mg of IPP are charged, followed by sufficient deaeration under cooling with liquid nitrogen. 0.6 g of TFE is charged, and the temperature is raised to 40° C., followed by stirring for 18 hours. The autoclave is cooled to terminate the reaction, whereby a solution of a polymer (F-6) is obtained.

The solution of the polymer (F-6) is diluted with 225cb, and n-hexane is added thereto to agglomerate the polymer (F-6), followed by filtration. The polymer (F-6) is stirred in 225cb, and re-agglomerated with n-hexane, followed by filtration. The polymer is dried under reduced pressure overnight at 80° C. The yield of the polymer (F-6) is shown in Table 1. Proportions of the respective structural units and the TQ value of the polymer (F-6) are shown in Table 2.

Polymer (H-6) is obtained from the polymer (F-6), in the same manner as in Ex. 1. The ion exchange capacity of the polymer (H-6) is shown in Table 2.

Liquid composition (L-6) is obtained from the polymer (H-6), in the same manner as in Ex. 1.

Ex. 7

Into a stainless steel autoclave having an internal capacity of 125 mL, 24.0 g of PDD, 79.0 g of BSVE-2E, 18 g of 225cb and 54.0 mg of IPP are charged, followed by sufficient deaeration under cooling with liquid nitrogen. 5.8 g of TFE is introduced into the system, and the temperature is raised to 40° C. Stirring is carried out at 40° C. for 21 hours, then gas in the system is purged, and the autoclave is returned to room temperature, whereby a solution of a polymer (F-7) is obtained.

The solution of the polymer (F-7) is diluted with 225cb, and n-hexane is added thereto to agglomerate the polymer (F-7), followed by filtration. The polymer (F-7) is stirred in 225cb, and re-agglomerated with n-hexane, followed by filtration. The polymer is dried under reduced pressure (degree of reduced pressure: 1 mmHg) overnight at 80° C. The yield of the polymer (F-7) is shown in Table 1. Proportions of the respective structural units and the TQ value of the polymer (F-7) are shown in Table 2.

A polymer (H-7) is obtained from the polymer (F-7) in the same manner as in Ex. 1. The ion exchange capacity of the polymer (H-7) is shown in Table 2.

A liquid composition (L-7) is obtained from the polymer (H-7), in the same manner as in Ex. 1.

Ex. 8

A polymer (F-8) is obtained in the same manner as in Ex. 7, except that an amount to be charged and a temperature are changed as shown in Table 1. The yield of the polymer (F-8) is shown in Table 1. Proportions of the respective structural units and the TQ value of the polymer (F-8) are shown in Table 2.

A polymer (H-8) is obtained from the polymer (F-8), in the same manner as in Ex. 7. The ion exchange capacity of the polymer (H-8) is shown in Table 2. A liquid composition (L-8) is obtained from the polymer (H-8), in the same manner as in Ex. 7.

Ex. 9

A polymer (F-9) is obtained in the same manner as in Ex. 7, except that an amount to be charged and a temperature are changed as shown in Table 1. The yield of the polymer (F-9) is shown in Table 1. Proportions of the respective structural units and the TQ value of the polymer (F-9) are shown in Table 2.

A polymer (H-9) is obtained from the polymer (F-9), in the same manner as in Ex. 7. The ion exchange capacity of the polymer (H-9) is shown in Table 2.

It is attempt to obtain a liquid composition in the same manner as in Ex. 7, but the liquid composition cannot be obtained since the polymer (H-9) remains as a solid form due to no dispersibility in a dispersion medium.

Ex. 10

A polymer (F-10) is obtained in the same manner as in Ex. 7, except that PPD is changed to MMD, and the amount to be charged and the temperature are changed as shown in Table 1. The yield of the polymer (F-10) is shown in Table 1. Proportions of the respective structural units and the TQ value of the polymer (F-10) are shown in Table 2.

A polymer (H-10) is obtained from the polymer (F-10), in the same manner as in Ex. 7. The ion exchange capacity of the polymer (H-10) is shown in Table 2.

A liquid composition (L-10) is obtained from the polymer (H-10), in the same manner as in Ex. 7.

to as an ETFE sheet) by a die coater, dried at 80° C. for 30 minutes, and further subjected to heat treatment at 185° C. for 30 minutes to obtain a polymer electrolyte membrane having a thickness of μm.

Ex. 11

39 g of water was added to 10 g of a supported catalyst having 50 mass % of platinum supported on a carbon

TABLE 1

| | | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| | Autoclave | mL | 2575 | 230 | 230 | 230 | 230 | 125 | 125 | 125 | 125 | 125 |
| Monomer | (c) TFE | g | 54 | 3.90 | 6.12 | 19 | 5.22 | 0.6 | 5.8 | — | 21 | 1.2 |
| | (b) PDD | g | 328 | 35.48 | 41.28 | 33.0 | 28.3 | 11.71 | 24 | 53.5 | 29 | — |
| | (d) MMD | g | — | — | — | — | — | — | — | — | — | 11 |
| | (a) BSVE-2E | g | 1076 | 94.26 | 83.38 | 86.0 | 96.22 | 95.15 | 79 | 36.6 | 35 | 141 |
| Polymerization | C6H | g | — | — | — | — | — | — | — | — | 10.0 | — |
| solvent | 225cb | g | — | — | — | — | — | — | 18 | — | — | — |
| Polymerization temperature | | ° C. | 24 | 28 | 28 | 24 | 24 | 40 | 40 | 40 | 24 | 21 |
| Nitrogen gas pressure | | MPa | 0.1 | 0.1 | 0.1 | 0.3 | 0.1 | — | — | — | 0.3 | 0.1 |
| Radical | PFB concentration | mass % | 3.1 | 3.1 | 3.1 | 3.1 | 3.1 | — | — | — | 3.1 | 3.1 |
| initiator | PFB solution | g | 13.64 | 1.26 | 1.21 | 1.15 | 1.20 | — | — | — | 1.03 | 0.97 |
| | IPP | mg | — | — | — | — | — | 33 | 54 | 27 | — | — |
| Polymerization time | | hr | 24 | 24 | 28 | 24 | 24 | 18 | 21 | 24 | 24 | 21 |
| Diluting solvent | | — | C6H | C6H | C6H | C6H | C6H | 225cb | 225cb | 225cb | C6H | C6H |
| Agglomeration | C6H | mass % | 80 | 80 | 80 | 80 | 80 | — | — | — | 80 | 80 |
| solvent | Methanol | mass % | 20 | 20 | 20 | 20 | 20 | — | — | — | 20 | 20 |
| | n-Hexane | mass % | — | — | — | — | — | 100 | 100 | 100 | — | — |
| Washing | C6H | mass % | 70 | 70 | 70 | 70 | 70 | — | — | — | 70 | 70 |
| solvent | Methanol | mass % | 30 | 30 | 30 | 30 | 30 | — | — | — | 30 | 30 |
| | 225cb | | — | — | — | — | — | — | Proper amount | Proper amount | Proper amount | |
| | n-Hexane | | — | — | — | — | — | — | Proper amount | Proper amount | Proper amount | |
| Number of washing | | Time | 5 | 3 | 3 | 3 | 3 | 1 | 1 | 1 | 3 | 3 |
| Yield | | g | 450 | 47.7 | 45 | 42 | 39 | 11.5 | 30 | 22 | 28 | 15 |

(Preparation of Polymer Electrolyte Membrane)

A polymer (F') was obtained by polymerizing BSVE-E, PSVE and TFE, in the same manner as in the method disclosed in Ex. 5 on page 29 of WO2008/090990.

A polymer (H') was obtained by converting —SO$_2$F groups in the polymer (F') to sulfonic acid groups, in the same manner as in Ex. 1. The ion exchange capacity of the polymer (H') was 1.5 meq/g dry resin.

Into a Hastelloy autoclave having an internal capacity of 2.5 L, 370 g of the above polymer (H') was added, and further a mixed dispersion medium of water/ethanol=50/50 (mass ratio) was added thereto to adjust the solid content concentration to 26 mass %. While stirring at a rotational speed of 150 rpm by means of double helical ribbon vanes, the temperature was raised to 120° C., and the mixed fluid was stirred for 15 hours. 200 g of water was added to the mixed fluid to adjust the dispersion medium composition to water/ethanol=58/42 (mass ratio) and the solid content concentration to 23 mass %, and the mixed fluid was stirred at a rotational speed of 150 rpm at 120° C. for one hour. The rotational speed was lowered to 50 rpm, the system was cooled to room temperature over a period of 5 hours. Ethanol was added to adjust the dispersion medium composition to water/ethanol=40/60 (mass ratio) and the solid content concentration to mass %, whereby a liquid composition (L') having the polymer (H') dispersed in the dispersion medium was obtained.

The liquid composition (L') was applied on the surface of a sheet made of an ethylene/TFE copolymer (AFLEX (registered trademark) 100N, manufactured by Asahi Glass Company, Limited, thickness: 100 μm) (hereinafter referred powder, followed by irradiation with ultrasonic waves for 10 minutes to obtain a dispersion of the catalyst. To the dispersion of the catalyst, 60 g of the liquid composition (L-1) was added, and 64 g of ethanol was further added to adjust the solid content concentration to 8 mass % to obtain a fluid for forming a catalyst layer. The fluid was applied on the surface of a separately prepared ETFE sheet and dried at 80° C. for 30 minutes and further subjected to heat treatment at 160° C. for 30 minutes to form a catalyst layer having an amount of platinum of 0.2 mg/cm$^2$.

The ETFE sheet was peeled from the above polymer electrolyte membrane produced, then the polymer electrolyte membrane was sandwiched between two catalyst layers provided with ETFE sheets and heat pressed at a pressing temperature of 160° C., for a pressing time of 5 minutes under a pressure of 3 MPa to bond the above-produced catalyst layers on both sides of the polymer electrolyte membrane, and the ETFE sheets were peeled from the catalyst layers to obtain a membrane/catalyst layer assembly having an electrode area of 25 cm$^2$.

On the surface of a gas diffusion layer made of a carbon paper, a carbon layer comprising carbon and polytetrafluoroethylene was formed. The membrane/catalyst layer assembly was sandwiched between such gas diffusion layers so that the carbon layer and the catalyst layer were in contact with each other, to obtain a membrane/electrode assembly. Such a membrane/electrode assembly was assembled into a cell for power generation, and the power generation characteristics were evaluated. The results are shown in Table 2.

Ex. 12 to 18 and 20

A membrane/electrode assembly is prepared in the same manner as in Ex. 16 except that the liquid composition (L-1) used for forming catalyst layers is changed to each of liquid compositions (L-2) to (L-18) and (L-20), and the power generation characteristics are evaluated. The results are shown in Table 2.

REFERENCE SYMBOLS

10: Membrane/electrode assembly
11: Catalyst layer
12: Gas diffusion layer
13: Anode
14: Cathode
15: Polymer electrolyte membrane
16: Carbon layer

TABLE 2

| | | | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|---|
| Polymer (F) | | | — | F-1 | F-2 | F-3 | F-4 | F-5 | F-6 | F-7 | F-8 | F-9 | F-10 |
| Structural units | (A) | BSVE-2E | mol % | 17 | 17 | 13 | 12 | 19 | 31 | 15 | 14 | 5 | 18 |
| | (B) | PDD | mol % | 68 | 76 | 80 | 65 | 73 | 67 | 60 | 86 | 65 | — |
| | (C) | TFE | mol % | 15 | 7 | 7 | 23 | 8 | 2 | 25 | — | 30 | 8 |
| | (D) | MMD | mol % | — | — | — | — | — | — | — | — | — | 74 |
| TQ value | | | | 280 | 283 | 293 | 280 | 258 | 235 | 241 | 248 | 245 | 220 |
| Polymer (H) | | | — | H-1 | H-2 | H-3 | H-4 | H-5 | H-6 | H-7 | H-8 | H-9 | H-10 |
| Ion exchange capacity | | | meq/g | 1.18 | 1.14 | 0.92 | 0.93 | 1.25 | 1.72 | 1.13 | 0.94 | 0.45 | 1.20 |
| Liquid composition (L) | | | — | L-1 | L-2 | L-3 | L-4 | L-5 | L-6 | L-7 | L-8 | — | L-10 |
| Membrane/electrode assembly | | | | Ex. 11 | Ex. 12 | Ex. 13 | Ex. 14 | Ex. 15 | Ex. 16 | Ex. 17 | Ex. 18 | — | Ex. 20 |
| Power generation characteristics (60° C.-100% RH) | | | — | ○ | ○ | ○ | ○ | Δ | X | ○ | X | — | Δ |
| Power generation characteristics (80° C.-no humidity) | | | — | ○ | ○ | Δ | Δ | ○ | ○ | X | Δ | — | X |

In Ex. 11 to 15, the polymer (F) has specific proportions of the specific structural units (A), the specific structural units (B) and the specific structural units (C), and therefore power generation characteristics are good even under low temperature and high humidity conditions or high temperature and low humidity conditions.

In Ex. 9, the proportion of the specific structural units (A) in the polymer (F) is low, and therefore the dispersibility of the polymer (H) in a dispersion medium is poor, and therefore it is impossible to obtain a liquid composition.

In Ex. 16, the proportion of the specific structural units (A) in the polymer (F) is high, and therefore the power generation characteristics under low temperature and high humidity conditions are insufficient.

In Ex. 17, the proportion of the specific structural units (B) in the polymer (F) is low, and therefore the power generation characteristics under high temperature and low humidity conditions are insufficient.

In Ex. 18, the proportion of the specific structural units (B) in the polymer (F) is high, the glass transition point is too high, and therefore the power generation characteristics under low temperature and high humidity conditions are insufficient.

In Ex. 20, structural units based on a perfluoromonomer having a five-membered ring are used instead of the specific structural units (B) in the polymer (F), and therefore the power generation characteristics under high temperature and low humidity conditions are insufficient.

INDUSTRIAL APPLICABILITY

The electrolyte material of the present invention is useful as an electrolyte material to be used for catalyst layers for a polymer electrolyte fuel cell. Further, it is also useful for other applications (such as a proton permselective membrane to be used for water electrolysis, hydrogen peroxide production, ozone production or waste acid recovery; a diaphragm for electrolysis of sodium chloride or a redox flow cell, or a cation exchange membrane for electrodialysis to be used for desalination or salt production).

This application is a continuation of PCT Application No. PCT/JP2015/085561, filed on Dec. 18, 2015, which is based upon and claims the benefit of priority from Japanese Patent Application No. 2014-262600 filed on Dec. 25, 2014. The contents of those applications are incorporated herein by reference in their entireties.

What is claimed is:

1. An electrolyte material, comprising a polymer (H) prepared by converting one or more —$SO_2F$ groups in a polymer (F) to ion exchange groups by a treatment method selected from the group consisting of a hydrolysis treatment and an acid-form conversion treatment:

Polymer (F): a polymer consisting of:
  structural units (A) represented by the following formula (u1),
  structural units (B) represented by the following formula (u2),
  structural units (C), which is tetrafluoroethylene, and
  structural unit (D), which is optional, selected from the group consisting of chlorotrifluoroethylene, trifluoroethylene, vinylidene fluoride, vinyl fluoride, ethylene, propylene, perfluoro(3-butenyl vinyl ether), perfluoro(allyl vinyl ether), a perfluoro α-olefin, a (perfluoroalkyl)ethylene, a (perfluoroalkyl)propene, a perfluoro(alkyl vinyl ether), the following monomer (m3), $$CF_2=CF(CF_2)_sOCF_2—CFZ-Q-SO_2F \qquad (m3)$$

wherein Q is a single bond or a perfluoroalkylene group which may have an etheric oxygen atom, Z is a fluorine atom or a monovalent perfluoro organic group, and s is 0 or 1,
wherein the proportion of the structural units (A) is from 8 to 19 mol %, the proportion of the structural units (B) is from 65 to 80 mol %, and the proportion of the structural units (C) is from 1 to 27 mol %, in 100 mol % of all structural units:

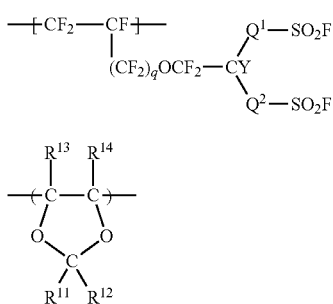

wherein:
Q¹ is a perfluoroalkylene group;
Q² is a single bond or a perfluoroalkylene group;
Y is a fluorine atom or a monovalent perfluoro organic group;
q is 0 or 1;
each of $R^{11}$ and $R^{12}$ which are independent of each other, is a fluorine atom or a $C_{1-5}$ perfluoroalkyl group; and
each of and $R^{13}$ and $R^{14}$ which are independent of each other, is a fluorine atom, a $C_{1-5}$ perfluoroalkyl group or a $C_{1-5}$ perfluoroalkoxy group,
wherein the following TQ value of the polymer (F) is from 255 to 300° C.:
TQ value: a temperature at which the extrusion rate becomes 100 mm³/sec, when the polymer (F) is subjected to melt-extrusion under an extrusion pressure condition of 2.94 MPa from a nozzle having a length of 1 mm and an inner diameter of 1 mm.

2. The electrolyte material according to claim 1, wherein the proportion of the structural units (A) is from 13 to 18 mol %, the proportion of the structural units (B) is from 67 to 78 mol %, and the proportion of the structural units (C) is from 4 to 20 mol %, in 100 mol % of all structural units constituting the polymer (F).

3. The electrolyte material according to claim 1, wherein the TQ value of the polymer (F) is from 260 to 290° C.

4. The electrolyte material according to claim 1, wherein the ion exchange capacity of the polymer (H) is from 0.7 to 1.29 meq/g dry resin.

5. The electrolyte material according to claim 1, wherein at least one type of structural units (A') obtained by converting precursor groups of the structural units (A) to ion exchange groups is structural units represented by the following formula (u'1):

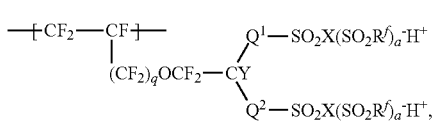

wherein:
$R^f$ is a perfluoroalkyl group;
X is an oxygen atom, a nitrogen atom or a carbon atom, such that a=0 when X is an oxygen atom, a=1 when X is a nitrogen atom, and a=2 when X is a carbon atom; and
q is 0 or 1.

6. The electrolyte material according to claim 1, wherein each of Q¹ and Q² which are independent of each other, is a $C_{1-6}$ perfluoroalkylene group.

7. The electrolyte material according to claim 6, wherein at least one of Q¹ and Q² is a $C_{1-6}$ perfluoroalkylene group having an etheric oxygen atom.

8. The electrolyte material according to claim 1, wherein at least one type of the structural units (B) is structural units represented by the following formula (u2-1):

9. A liquid composition, comprising a dispersion medium and the electrolyte material as defined in claim 1, dispersed in the dispersion medium, wherein the dispersion medium comprises contains an organic solvent having a hydroxy group.

10. The liquid composition according to claim 9, comprising from 1 to 50 mass % of the electrolyte material.

11. A catalyst layer in an electrode of a membrane/electrode assembly for a polymer electrolyte fuel cell, the catalyst layer comprising a proton conductive polymer formed of the electrolyte material of claim 1.

12. A membrane/electrode assembly for a polymer electrolyte fuel cell, the membrane/electrode assembly comprising an anode having a catalyst layer containing a proton conductive polymer, a cathode having a catalyst layer containing a proton conductive polymer, and a polymer electrolyte membrane disposed between the anode and the cathode,
wherein the proton conductive polymer contained in the catalyst layer of at least one of the cathode and the anode is the electrolyte material of claim 1.

13. The electrolyte material according to claim 1, wherein Q¹ is a perfluoroalkylene group which comprises an etheric oxygen atom.

14. The electrolyte material according to claim 1, wherein Q² is a single bond.

15. The electrolyte material according to claim 1, wherein Q² is a perfluoroalkylene group.

16. The electrolyte material according to claim 14, wherein said perfluoroalkylene group comprises an etheric oxygen atom.

17. The electrolyte material according to claim 5, wherein $R^f$ is a perfluoroalkylene group which comprises an etheric oxygen atom.

* * * * *